April 21, 1970 J. F. MILLET ETAL 3,508,087
HOT ELECTRODES FOR MAGNETOHYDRODYNAMIC GENERATORS, IN PARTICULAR
OF THE OPEN CYCLE TYPE
Filed June 9, 1967 3 Sheets-Sheet 3

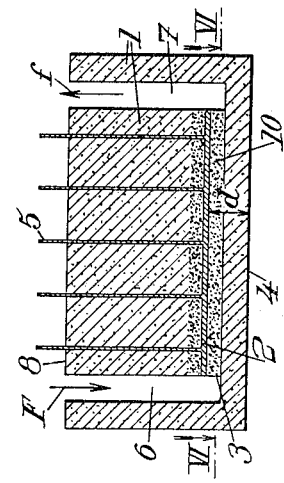
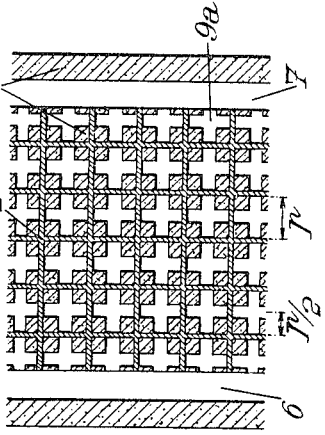
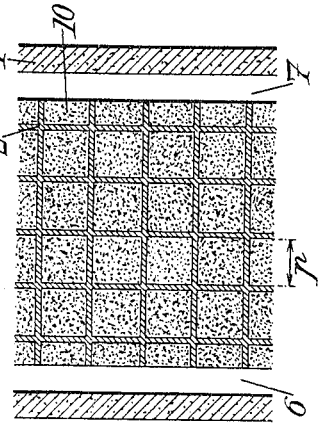
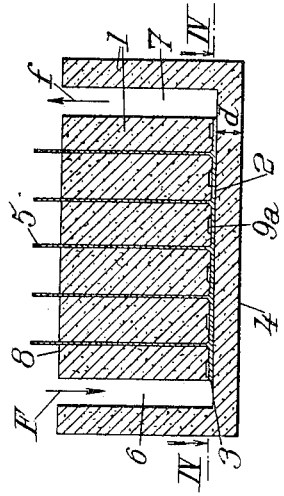
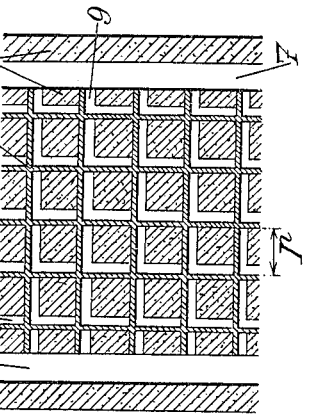
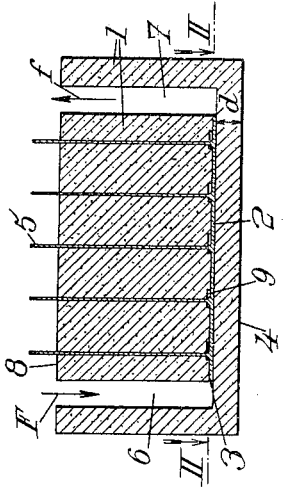

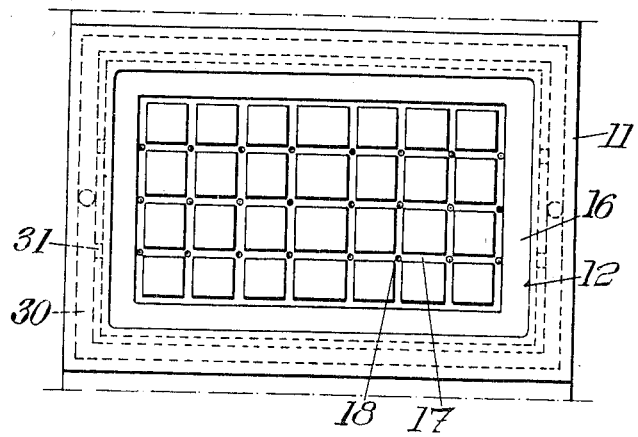
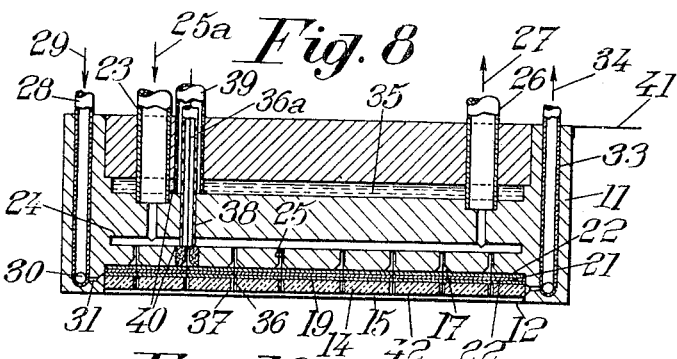
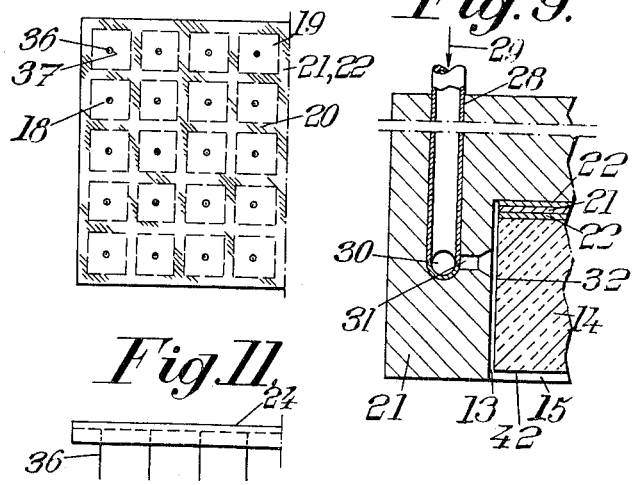

United States Patent Office 3,508,087
Patented Apr. 21, 1970

3,508,087
HOT ELECTRODES FOR MAGNETOHYDRODYNAMIC GENERATORS, IN PARTICULAR OF THE OPEN CYCLE TYPE
Jacques F. Millet, Paris, Raoul Graziotti, Argenteuil, and Michel M. Guillou, Gif-sur-Yvette, France, assignors to Electricite de France Service National, Paris, France, a society of France
Filed June 9, 1967, Ser. No. 644,880
Claims priority, application France, June 13, 1966, 65,284; Mar. 21, 1967, 99,618; May 26, 1967, 108,127
Int. Cl. G21d 7/02
U.S. Cl. 310—11                                36 Claims

ABSTRACT OF THE DISCLOSURE

A hot electrode of a magnetohydrodynamic generator consists of a mass of material having an ionic conduction, wherein is embedded a current collector, and means are provided for injecting an oxygen containing gas at the level of the cathode zone of the electrode, that is to say at the level of the surface of contact between the electrode and the current collector for a hot cathode or at the level of the surface of contact between the electrode and the plasma stream for a hot anode. For this purpose, in the case of a cathode, it may be provided, on the inside thereof, with a system of channels for the feed, the circulation and the outflow of a gaseous stream rich in oxygen at the level of said surface of contact.

---

The present invention relates to hot electrodes (that is to say electrodes immersed in a very hot stream of ionized gas or plasma) for magnetohydrodynamic generators (also called magnetoaerodynamic generators), which will hereinafter be designated by the term "M.H.D. generators." This invention is more especially concerned with M.H.D. generators working in open cycle fashion, that is to say without recycling of the ionized hot gas stream, this stream merely flowing through the nozzle of the M.H.D. generator wherein the hot electrodes are disposed.

The chief object of our invention is to provide improvements in M.H.D. generator hot electrodes, especially concerning their stability, their strength and their efficiency during a long time operation of the generator.

It has already been proposed to make M.H.D. generator hot electrodes not of materials having an essentially electronic conduction, such as metals and alloys, but of materials having an essentially ionic conduction, such as some ceramic materials and in particular zyrconias stabilized in cubic phase by addition of bivalent or trivalent cations, such zyrconias having an excellent chemical behavior (resistance to corrosion) and an excellent mechanical behavior (resistance to attrition) when in contact with a hot gas stream. However, as this gas is ionized and therefore constitutes a conductor, an electrode made of a material having an ionic conduction undergoes electrolytic phenomenons due to the fact that it is located between this first conductor and a second conductor consisting of the current collector (which serves to transfer the collected charges toward the utilisation means of the M.H.D. generator). Therefore, an ionic conduction electrode, in particular zyrconia, undergoes transformations which are very inconvenient.

We found that it is possible to avoid, or at least to reduce, the electrolytic phenomenon in an M.H.D. generator ionic electrode by injecting oxygen into the cathode zone of such an electrode.

Our invention therefore consists, essentially in injecting an oxygen containing gas at the level of the cathode zone of a M.H.D. generator hot electrode having an at least partly ionic conduction, that is to say, in the case of a hot cathode, at the level of the surface of contact between said cathode and the current collector and, in the case of a hot anode, at the level of the surface of contact between said anode and the plasma stream.

For this purpose we may provide in the electrode,
Either a system of channels for the inflow, circulation and evacuation of a gaseous stream rich in oxygen, in particular an air stream containing an excess of oxygen, at the level of the cathode zone of the electrode,
Or, at the level of the cathode zone of the electrode, a region of high open porosity and channels for feeding a gaseous stream rich in oxygen, in particular a stream of air containing an excess of oxygen, into said region and evacuating the residual gaseous stream from this region.

In the last mentioned case, it may be advantageous to house the hot electrode having an at least partly ionic conduction (and made of a porous semi-conductor substance such as a ceramic material of the zyrconia type) in a recess of a metal block the bottom face of which is provided with a multiplicity of channels, against which bottom face is applied the cold face of the electrode (i.e. that not in contact with the plasma) with the interposition of a plurality of conducting metal strips to ensure intimate connection with a mechanical, thermal and possibly electrical contact as perfect as possible between the electrode cold face and the metal block recess bottom face. Through this metal block extend, on the one hand, conduits for feeding an oxygen containing gaseous stream to the multiplicity of channels and evacuating this stream and/or for feeding an oxygen containing gaseous stream to the periphery of the electrode and evacuating this stream and, on the other hand, conduits for a cooling fluid, whereas metal wires extend through the electrode between its hot face (that in contact with the plasma) and its cold face, said wires extending through the metal block after passing between the metal strips, in particular at the points where they intersect one another, most of these wires being connected to the metal block.

We thus ensure efficiently the circulation of the oxygen containing gaseous stream, the mechanical, thermal and possibly electrical connection between the electrode and its metal support, and also possibly the measurement of the temperature and/or the potential at one or several points of the electrode in contact with the hot plasma.

In a modification, we may provide in the hot electrode a network of twisted or threaded wires limiting the crack producing effect which may occur in the mass thereof under the effect of thermal stresses.

The invention is particularly well adapted to hot electrodes, in particular cathodes, made of a ceramic having an ionic conduction, such as a stabilized zyrconia, for a M.H.D. generator working in open cycle fashion.

Preferred embodiments of the present invention will be hereinafter described with reference to the appended drawings given merely by way of example and in which, FIG. 1 is a sectional view through a plane perpendicular to the front face of contact with the plasma stream of an embodiment of a M.H.D. generator hot cathode made according to the present invention;

FIG. 2 is a sectional view on the line II—II of FIG. 1;

FIG. 3 is a view similar to FIG. 1 but relating to another embodiment of the invention;

FIG. 4 is a sectional view on the line IV—IV of FIG. 3;

FIG. 5 is a view similar to FIGS. 1 and 3 of still another embodiment of the invention;

FIG. 6 is a sectional view on the line VI—VI of FIG. 5;

FIG. 7 is a bottom plan view of a metal block adapted to receive a ceramic material electrode for a M.H.D. generator, according to the present invention;

FIG. 8 is a longitudinal sectional view of a metal block according to FIG. 7 with the ceramic material electrode in position in its housing;

FIG. 9 shows on an enlarged scale the lower left hand corner of FIG. 8;

FIG. 10 is a plan half view showing from below the electrode of FIG. 8, to illustrate the arrangement of the metal layers connecting this electrode with the metal block;

FIG. 11 is a side view of a conduit, provided in the metal block, for the circulation of an oxygen containing gaseous stream, and receiving the upper ends of the metal wires connected with the metal block;

Figure 16:
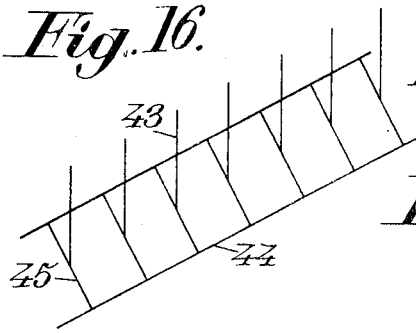
Figure 17:
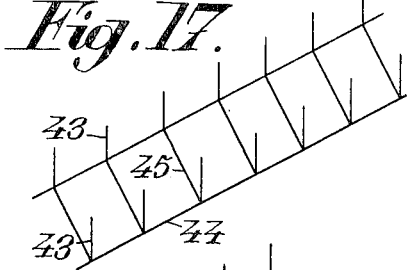
Figure 18:
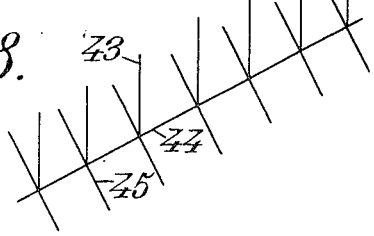

FIGS. 16, 17 and 18 diagrammatically show three possible arrangements of the network of twisted or threaded wires.

The following description relates to the constitution of a hot electrode for a M.H.D. generator, in particular of the open cycle type.

This electrode is made in the known manner of an ionic conduction mass 1, for instance of a ceramic material, such as zyrconia stabilized in the cubic phase by addition of bivalent or trivalent cations ($Ca^{++}$, $Mg^{++}$, $Y^{3+}$ and rare earths in general), in which is embedded at least one current collector 2. According to the present invention, we inject an oxygen containing gas, in particular air containing an excess of oxygen, at the level of the cathode zone of the electrode, that is to say, in the case of a hot cathode, at the level of the surface 3 of contact between said cathode and the current collector but in the case of a hot anode, at the level of the surface of contact between said anode and the plasma.

We thus reduce, or even eliminate, the noxious effects of the electrolytic phenomena that generally occur in the ionic conduction electrodes of the prior art (i.e. without injection of oxygen into the cathode zone).

Ionic semi-conductors of the zyrconia type are solid electrolytes through which electric current flows by displacement of $O^{2-}$-ions between two electronic conductors, to wit the current collector and the plasma stream, in a M.H.D. generator, the whole of the current collector, the hot electrode and the plasma therefore constituting a galvanic or electrochemical cell.

Such a cell comprises an anode, an electrolyte and a cathode, the material of the cathode easily accepting electrons while undergoing a reduction, whereas the material of the anode delivers electrons while undergoing an oxidation. Electrolysis is accompanied by physical and chemical changes in the cathode, the electrolyte and the anode.

In the case of an ionic conduction M.H.D. generator hot cathode, the cathode of the electrochemical cell (called cathode zone of the hot electrode in the definition of the invention) is constituted by the surface of contact betwen the hot cathode and the current collector, which undergoes reduction reactions, whereas the surface of contact between the hot cathode and the plasma stream, which constitutes the anode of the electrochemical cell (which may be called the anode zone of the hot electrode), undergoes oxidation reactions.

It is the contrary that takes place in a M.H.D. generator hot anode. The anode of the electrochemical cell, at the level of which oxidation reactions take place, consists of the surface of contact between the hot anode and the current collector, whereas the cathode of the electrolytic cell, at the level of which reduction reactions take place, consists of the surface of contact between the hot anode and the plasma stream.

In both cases (hot cathode or hot anode of a M.H.D. generator) a flow of $O^{2-}$-ions would take place from the cathode zone toward the anode zone of the electrolytic cell constituted by the current collector, the hot electrode and the plasma stream. The cathode zone would therefore lose oxygen anions, whereas the anode zone of the cell would become richer in this gas.

The essential feature of our invention consists in injecting oxygen into the cathode zone, that is to say, at the level of the surface of contact either betwen the hot cathode and the current collector or between the hot anode and the plasma stream.

In the case of a M.H.D. generator hot cathode, the injection of oxygen may be performed at the level of the surface of contact of the metal current collector (made of a noble metal such as platinum or of an alloy of noble metals) with the ionic conduction ceramic, such as a stabilized zyrconia, by providing Either a system of channels for the inflow, circulation and outflow of a gaseous stream rich in oxygen, in particular an air stream containing an excess of oxygen, at the level of the cathode zone of the electrode, Or, at the level of the cathode zone of the electrode, a region of high open porosity, with channels for the inflow of a gaseous stream rich in oxygen, in particular an air stream containing an excess of oxygen, to said region and for the outflow of the residual gaseous stream from said region.

Thus, oxygen is constantly supplied at the surface of contact between the hot cathode and the plasma stream which constitutes the anode zone, without modification of the structure of the ceramic material. This release of oxygen goes with a substantial emission of electrons from this surface of contact due to the oxidation (as above stated the anode of an electrolytic cell is the seat of oxidation phenomenons) of the anions $O^{2-}$ according to the reaction $O^{2-} \rightarrow \frac{1}{2} O^2 + 2e^-$.

This emission of electrons has the double advantage of increasing the conductivity of the boundary layer of the plasma stream flowing along the hot cathode (which increases the power and efficiency of the M.H.D. generator) and of reducing, or even eliminating, the noxious arcs which often occur between the cathodes and the plasma stream in M.H.D. generators when these cathodes do not supply enough electrons.

In the case of a M.H.D. generator hot anode, the injection of oxygen at the level of the surface of contact between the plasma stream and the ceramic material of the anode, which surface constitutes the cathode zone of the electrochemical cell, may be obtained by providing in the vicinity of this surface of contact a zone of high open porosity or even channels permitting the circulation of a gaseous stream rich in oxygen, with channels for feeding this gaseous stream to said zone and for evacuating the residual gaseous stream therefrom. Both of the above mentioned methods may be used simultaneously.

At the same time, there is produced at the level of the surface of contact between the hot anode and the current collector, an electrochemical oxidation of the most reducing element or compound present therein. In order to avoid oxidation of the current collector, the anodic current collector is made of a noble metal, such as platinum, or of an alloy of noble metals, or again of non-oxidizable material. In this case, the transformation of the charge conveyors from the ionic state into the electronic state, in the surface of contact between the current collector and the hot anode takes place by discharge of the O²⁻ anions and release of oxygen. The oxygen thus released may be evacuated from the anode through channels provided in the ceramic material or even merely by diffusion through said ceramic material if the latter includes a high porosity region at the level of the surface of contact between the current collector and the anode, where takes places the transfer of the charges from the ionic state to the electronic state with release of oxygen.

We will now describe, with reference to the appended drawings, examples of hot cathodes for M.H.D. generators, made of ionic conduction ceramic materials acting by displacement of O²⁻ anions, in particular of zyrconias stabilized in cubic phase by addition of bivalent or trivalent cations. It will be noted that these examples and the invention itself in general also apply to the case of hot electrodes made of refractory materials wherein the conduction is both electronic and ionic. As a matter of fact most of the non-stoichiometric oxides have a conduction which is both electronic and ionic. This is also the case of non-stabilized zyrconia. On the contrary zyrconia stabilized with calcium, magnesium or yttrium has an essentially ionic conduction, whereas when it is stabilized with praseodymium it would have a chiefly electronic conduction.

In the three following examples, the current collector 2 consists of a platinum or platinum and rhodium grid (visible in particular in FIGS. 2, 4 and 6) embedded in the ceramic material mass 1 in the vicinity of the front face 4 of the cathode along which flows the hot plasma stream (when the M.H.D. generator is in operation). The distance $d$ between grid 2 and said front face 4 is chosen such that the temperature of the grid is higher than 1,400° C. during operation. As for the electrical connection between grid 2, which forms the current collector, and the cold or semi-hot metal conductor (not shown) through which current is fed for utilisation, it is ensured by platinum wires 5 embedded in the ceramic material mass 1 and extending at right angles to the front face 4 of the cathode.

In these embodiments of the invention, at least two channels 6 and 7 are provided in the ceramic material mass 1 between the free face 8 of the hot cathode and the cathode zone 3 forming the surface of contact between the current collector and the hot cathode, to wit a channel 6 for the inflow of the oxygen containing gaseous stream in the direction of arrow R, and at least one channel 7 for the outflow, in the direction of arrow $f$, of the residual gaseous stream. Channel 6 thus ensures the continuous inflow of oxygen to the immediate vicinity of the electrochemical cathode constituted by the surface of contact between the current collector and the ceramic material mass. The flow of the gaseous stream at the level of said surface of contact between channels 6 and 7 is obtained through different means in the three examples of FIGS. 1 to 6, as it will be hereinafter explained. However, it will be noted that the porosity inherent in the ceramic material facilitates in all cases the feed of oxidizing oxygen to said surface of contact.

In the embodiment of FIGS. 1 and 2 a multiplicity of channels 9 extending in two directions at right angles to each other is provided in the ceramic material mass 1 in the cathode zone 3 thereof, these channels being located adjacent to the elements of grid 2, respectively, being at the distance $p$ from one another. These channels 9 communicate on one side with the gaseous stream inlet conduit 6 and on the other side with the channel 7 for the outflow of the residual gaseous stream, whereby channels 6, 7 and 9 ensure a continuous inflow of oxygen into the immediate vicinity of the electrochemical cathode, that is to say, into the area of contact between the hot cathode and the current collector. Channels 9 serve to distribute oxygen to practically all points of surface 3.

A cathode of the type illustrated by FIGS. 1 and 2 may be made in different manners.

For instance a double grid is obtained by woving a pair of continuous wires, to wit in the first place a wire (for instance of platinum or platinum and rhodium) of a noble metal or of an alloy of noble metals (silver being not considered in this case as a noble metal) and on the other hand a wire of a metal soluble in an acid. This double grid is embedded in a body of ceramic material and the whole is compressed. A first sintering operation is performed. The sintered mass is immersed in an acid until the grid portion made of a metal soluble in the acid is dissolved. The other half of the grid, made of the noble metal, which has not been attacked by the acid, constitutes the current collector 2 along which is formed the system of channels 9 resulting from the disappearance of the dissolved wire. The cathode is washed and dried. Then a second sintering operation is performed at a temperrature higher than that of the first sintering.

According to a modification, the soluble metal wire is eliminated not by a chemical attack but by anodic electrochemical dissolution, by dipping the cathode, after the first sintering operation in an electrolyte bath wherein is also immersed a conventional electrolytic cell auxiliary cathode and by connecting an external electric current source between the conducting metal grid of the cathode according to the invention as it is being manufactured and said conventional cathode. the latter being connected as an electrolytic cathode.

According to a second modification, we substitute, in the double grid, a silver wire to the soluble metal wire. This silver wire is eliminated during the sintering operation. A single sintering operation may be used by melting and dispersion of the molten silver by the capillary forces. It is therefore sufficient, after having embedded the double grid of platinum (or other noble metal or alloy) and of silver in the ceramic material mass, to sinter said mass.

In the embodiment of FIGS. 3 and 4 the channels 9a for the circulation of the oxygen containing gaseous stream are not contiguous to the wires of the current collecting grid 2. Channels 9a form a grid identical to the collecting grid 2, that is to say, with the same distance $p$ between its elements but with an offsetting of $p/2$.

The preparation of the hot cathode of FIGS. 3 and 4 may be performed in the same manner as above indicated for the cathodes of FIGS. 1 and 2 with the difference that in the case of FIGS. 3 and 4 use is made of a mixed grid with a distance of $p/2$ between its elements, every second wire element being made of platinum (or another noble metal or alloy) whereas the other wire elements are made of a metal which can be eliminated (metal soluble by means of an acid or eliminable in anodic electrochemical fashion or silver eliminable by heating). We thus obtain, after elimination of the soluble metal wire or of the silver wire, on the one hand the current collecting grid 2 having its elements at a distance $p$ from one another, and on the other hand, the system of channels 9a for the circulation of the oxygen containing gaseous stream, this system being not contiguous to grid 2 but sufficiently close thereto to ensure a good feed of oxygen to the surface of contact between the hot cathode and the current collector. The gaseous stream is fed through channel 9 and withdrawn through channel 7.

It will be noted that the construction of FIGS. 3 and 4 has the advantage of ensuring an excellent contact between the collecting grid 2 and the mass of ceramic material because the grid is tightly held in said mass.

In the embodiment of FIGS. 5 and 6, the collecting grid 2, identical to that of FIGS. 1 and 2 and also to that of FIGS. 3 and 4 is located in a zone 10 of the ceramic material mass which has a very great porosity with open pores. Oxygen is fed to collecting grid 2 by the flow of a gaseous stream rich in oxygen through channel 6, diffusion of this gaseous stream taking place through the porous portion of the ceramic material. The residual gaseous stream flows out through conduit 7.

The desired porosity of zone 10 may be obtained in different ways, in particular by introducing into this portion of the ceramic material, before the latter is compressed, silver as expanding substance, this silver being eliminated during sintering at high temperature.

The above indications concerning the three examples of hot cathodes illustrated by FIGS. 1 to 6 may also apply to make hot anodes for M.H.D. generators with however the difference that the system of channels (or the portion with open pores) for the passage of the oxygen obtaining gaseous stream between an inlet conduit and an evacuation conduit, instead of being disposed at the level of the surface of contact between the hot electrode and the current collector, is located at the level of the surface of contact between the hot electrode and the plasma stream.

In the case of electrodes comprising at the level of their cathode zone, a high porosity region extending between a channel for the inflow of an oxygen rich gaseous stream to said region and a conduit for the evacuation of the residual gas stream from said region, we may use an arrangement such as illustrated by FIGS. 7 to 11 inclusive.

The support (FIGS. 7 to 9) consists of a metal black 11 for instance of refractory steel, for instance 25–20 steel (containing 25% of Cr and 20% of Ni) or of copper. This block is of substantially parallelepipedal shape and is provided with a recess 12, also of parallelepipedal shape and having substantially the dimensions of electrode 14. As a matter of fact, recess 12 is of a cross-section substantially smaller than that of electrode 14 (as shown by FIG. 9) so as to leave a clearance 13 permitting expansion of the ceramic material electrode 14, the coefficient of expansion of which is different from that of metal block 11 (during operation, clearance 13 becomes practically zero). Likewise, there is provided a small difference 15 between the depth of recess 12 and the thickness of electrode 14, so that after expansion during operation, electrode 14 does not project from block 11 but has its hot face 42 just flush with said block in order to prevent too fast a wear or tear of the electrode.

Block 11 is provided, in the bottom face 16 of its recess 12, with a system of channels 17 intersecting one another at 18. Between the cold face 19 of electrode 14 (which is not in contact with the hot plasma stream) and said bottom face 16 of block 11, with a plurality 20 (FIG. 10) of metal strips ensuring an intimate mechanical, thermal and possibly electric contact connection between said electrode cold face 19 and said block face 16. In In the advantageous embodiment illustrated by the drawings, there is applied, by means of a spray gun or a plasma torch, a first layer 22 of palladium on the one hand on the face 19 of the electrode and on the other hand on the face 16 of block 11. Then, in the same manner, a second layer 21 of silver-palladium alloy is deposited on each layer 22 respectively. Electrode 14 is then inserted in block 11 as illustrated by FIG. 8, that is to say with two silver-palladium alloy layers 21 in contact with each other, between the palladium layers 22. The electrode is pressed against the bottom of the recess and the whole is placed in a furnace at about 1,100° C. in order to ensure the brasing together of the two silver-palladium layers 21 (shown as a single layer in the drawings). These superposed layers 22–21–22, as shown by FIG. 10, ensure a mechanical, thermal and possibly electrical connection between electrode 14 and block 11, the geometrical configuration of these layers being obtained by means of masks used for depositing said layers by means of a spray gun or of a plasma torch.

Metal block 11 is provided with channels for the inflow and the evacuation of gaseous stream containing oxygen and a cooling fluid.

In particular we may provide, as illustrated, two circuits for the circulation of an oxygen containing gas in particular air, to wit a primary air circuit and a secondary air circuit.

The primary air circuit (which is always present in a cathode) includes an inlet conduit 23 opening into a chamber 24 in communication through tubular passages 25 with a system of channels 17 and in particular with the crossings or intersections 18 thereof. The oxygen containing gas stream fed as illustrated by arrow 25a flows along the channels 17 of the cold wall 19 of electrode 14 in the portions thereof which are not covered by layers 21–22. As the ceramic material, and in particular zyrconia, is porous, the gaseous stream flows into the electrode, to a degree depending upon the pressure of the gaseous stream fed at 24 and upon the porosity of the ceramic material. The primary gaseous stream having lost part of its oxygen flows out through conduit 26 as illustrated by arrow 27.

As for the secondary gaseous stream (which is always present in an anode) it flows in through a conduit 28, as illustrated by arrow 29, and it circulates through peripheral conduit 30 around electrode 14. Tubes 31 serve to the feed of the secondary gaseous stream along the periphery 32 of electrode 14. Owing to the porosity of the ceramic material of the electrode, the secondary gaseous stream flows through said electrode and flows out, after it has lost some of its oxygen, through a conduit 33, as illustrated by arrow 34.

Cooling is ensured by the circulation at high velocity of a stream of de-ionized water, which passes through a water chamber 35 provided in block 11.

Finally, metal wires 36 extend through electrode 14 between the hot face 42 and the cold face 19 thereof, through bores 37 provided in this electrode, in particular at the level of tubes 25, and extending through metal block 11, in particular through tubes 25, after having passed between the system 20 of metal layers 21–22 at the level of intersections 18. Most of these wires 36 are connected with metal block 11 and in particular are welded to the periphery of conduit 24 (FIG. 11) after having been bent. Some wires may be insulated from said block as illustrated by FIG. 8 for one wire which extends through this block through an alumina tube 38 protected at its upper part by a refractory steel tube 39, such tubes being held at 40 by means of a cement. In a modification, the upper ends of the wires 36 that are not insulated might end in blind holdes provided in block 11, being welded to the walls of these blind holes.

Metal wires 36 first have a double function, to wit, on the one hand, to transmit the electric current available on electrodes 14 either from or toward electrode 14 according as it is a cathode or an anode, respectively, by ensuring electrical connection between the hot face 42 of electrode 14 and block 11, the output of current being at 41, and, on the other hand, to form a part of the mechanical support of the porous zyrconia electrode 14 which, so to speak, is reinforced by wires 36.

Furthermore, wires 36 may play a third part by making use of two kinds of wires, for instance not only platinum wires but also one or several wires of a platinum and rhodium alloy to constitute one or several thermocouples made of platinum and platinum and rhodium alloy each starting from the same point of electrode 14. In this case the platinum and rhodium alloy wires pass through tubes of the type illustrated at 38 and 39, that is to say, are insulated from the metal block, whereas the platinum wires may be either insulated by means of such tubes or on the contrary connected with the metal block (or again as illustrated by FIG. 11 or again in blind holes as above stated). The first solution (both of the wires of a thermocouple electrically insulated from metal block 11) has the advantage of affording a higher precision of measurement but of course at the cost of a complication in the consstruction and therefore an increase in the cost of manufacture.

In a magnetohydrodynamic generator of the industrial type, it is advantageous to provide one or two thermocouples the platinum wires of which may be either insulated or on the contrary noninsulated, the second conductor of the thermocouple being in this case constituted by the whole of the block, that is to say, by the output 41.

On the contrary, if it is desired to make an experimental generator, many thermocouples may be provided so as to determine the temperature distribution over the electrode. Of course, when it is desired to measure the temperature it is necessary to eliminate the magnetic field normally present in a magnetohydrodynamic generator in operation, in such manner as to collect between the two conductors of the thermocouple a temperature potential difference. On the contrary when the magnetic field is present, the insulated conductors of the thermocouples permit the potential to be distributed along the electrode.

In FIGS. 7 and 10 we have illustrated an electrode of rectangular section with one side slightly longer than the other one. This shape of the cross-section has been given merely by way of illustration and the invention applies to other shapes, in particular to electrodes of elongated shape where the great side of the rectangular cross-section is much greater than the small side. In this case the system of channels might consist of only two channels parallel to the great side of the rectangle interconnected by a multiplicity of channels perpendicular to this direction.

On the other hand, we have up to now described, with reference to FIGS. 7 to 11, a cathode for a M.H.D. generator. The same construction might be used for an anode, possibly without channels 17 and the system for feeding them with an oxygen containing gas and for removing the wasted gas (primary circuit) because, as stated with reference to FIGS. 1 to 6, the circulation of the oxygen containing gas must take place, in an anode, on the hot face and in this case the circulation of secondary air is sufficient (on the contrary in the case of a cathode it is the circulation of primary air over the cold face that is necessary).

However, we may also provide a magnetohydrodynamic generator comprising both cathodes and anodes of the type illustrated by FIGS. 7 to 11 (with circulation of a primary oxygen containing gas and a secondary oxygen containing gas). In this case it would be possible, from time to time, to reverse the polarity of the magnetic field, the same electrodes alternately playing the part of anodes and of cathodes. Such an operation has the advantage of increasing the duration of life of the electrodes by reducing the wear thereof during their operation as cathodes.

In the embodiments of FIGS. 12 to 18, which are modifications of the embodiment of FIGS. 7 to 11, we dispose, in the ceramic mass that constitutes the electrode, a network of twisted or threaded wires (in particular made of a platinum alloy) improving the mechanical behavior of this mass, even in the presence of high thermal stresses.

In FIGS. 12 to 15 we have used the same reference numerals as in FIGS. 7 to 11 to designate corresponding elements.

In the embodiment of FIGS. 12 to 15, the support is made, as in the construction of FIGS. 7 to 11, of a metal block 11 in particular of refractory steel (for instance of the 25–20 type) or of copper. This block has a substantially parallelepipedal shape and is provided with a recess 12 also of parallelepipedal shape, having substantially the dimensions of electrode 14. Actually, recess 12 is of a cross-section slightly smaller than that of electrode 14 so as to leave a clearance 13 which permits expansion of ceramic electrode 14, the coefficient of expansion of which is different from that of metal block 11 (during operation, clearance 13 is practically eliminated). Likewise, there is a small difference between the depth of recess 12 and the height of electrode 14, so that, after differential expansion of electrode 14 during operation, said electrode no longer projects from block 11 but is flush with the hot face 42 of the said block in order to prevent a quick wear of the electrode.

Block 11 is provided, as in the construction of FIGS. 7 to 11, in its bearing face 16, with a network of channels 17 (always present in a cathode) which intersect one another at points 18. Between the cold face 19 (which is not in contact with the hot plasma) of electrode 14 and this bearing face 16 of block 11 said block is provided with a network 20 (FIG. 15) of conducting metal layers for ensuring an intimate connection and a mechanical, thermal and possibly electric contact as perfect as possible between cold face 19 and bearing face 16. These layers are generally of the type above described, although this is not absolutely necessary.

Metal block 11 is provided with conduits for the feed and the outflow of oxygen containing gaseous streams and also possibly of a cooling fluid.

The primary air circuit (always present in a cathode) comprises two feed conduits 23 opening into a chamber 24 which communicates through tubular passages 25 with the system of channels 17. The stream of oxygen containing gas fed as illustrated by arrow 25a flows, along channels 17, in contact with the cold face 19 of electrode 14 in the areas which are not covered by the layers of network 20. As the ceramic material, and in particular zyrconia, has some porosity, the gaseous stream penetrates into the electrodes, this penetration depending upon the pressure of the gaseous stream fed to chamber 24 and upon the porosity of the ceramic material. The primary gaseous stream which has lost a portion of its oxygen flows out through a conduit 26 as indicated by arrow 27.

As for the secondary gaseous stream (which is always present in an anode), it flows in through a conduit 28 as indicated by arrow 29, and it circulates through a peripheral conduit 30 around electrode 14.

Tubes 31 serve to feed the secondary gaseous stream along the periphery 32 of electrode 14. Owing to the porosity of the ceramic material of the electrode, the secondary gaseous stream flows in through said electrode and flows out, after it has lost some of its oxygen, through a conduit 33, as illustrated by arrow 34.

Cooling is ensured by the circulation at high velocity of a stream of de-ionized water which passes through a water chamber (not shown) provided in block 11.

The structure illustrated by FIGS. 12 to 15 are analogous to that above described with reference to FIGS. 7 to 11. We will now describe how it is possible to improve the mechanical behavior of the electrode, in particular of zyrconia, despite the severe thermal stresses that occur therein.

As a matter of fact, the coefficient of expansion of some ceramic materials to be used for the electrodes of a M.H.D. generator, such as nonstabilized zyrconias or zyrconias that are being destabilized, does not vary in a regular manner as a function of the temperature. When the temperature of the ceramic material increases gradually from ambient temperature up to the range 1,000–1,500° C. (temperature of the hot face 42 of the electrode), the coefficient of expansion is first positive, then negative, then again positive, the two limits where the sign of the coefficient changes depending upon the ceramic material. A similar variation of the coefficient of expansion takes place during cooling, the values of the coefficient and the temperature at which it changes sign being however somewhat different during cooling and during heating, a heating-cooling cycle producing, for the variation of the coefficient of expansion a hysteresis cycle.

In a ceramic material electrode subjected in a M.H.D. generator to a thermal gradient, the expansions and contractions of this electrode produce, successively in space and simultaneously in time, in the mass of the electrode, stresses of contrary signs which produce cracks by shearing when the limit of resiliency is locally exceeded.

This phenomenon is particularly important in the electrode layers close to the plasma stream and wherein the temperature varies most quickly.

In order to avoid the formation of cracks, or at least to limit their development, we incorporate, in the ceramic material of electrode 14, twisted or threaded wires or rods 43, 44, 45. These rods are disposed in the mould where the electrode is to be cast which ensures an excellent anchoring of the rods in the ceramic material. The ceramic material particles are kept in position by this network of twisted or threaded wires or rods, thus stopping any tendency to cracking under the effect of thermal stresses.

The rods or wires are advantageously made of a platinum alloy, in particular a rhodium and platinum alloy, to withstand the high temperature in the presence of oxygen.

Figure 14:
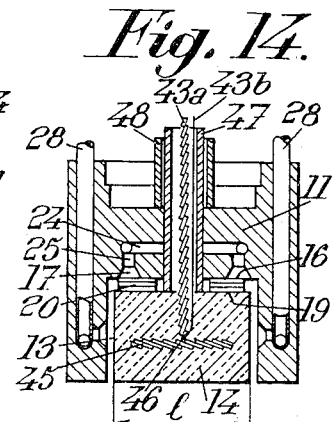
FIG. 14 is a sectional view on the line A–B of FIG. 12.
Figure 15:
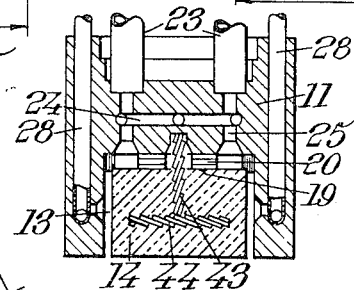
FIG. 15 shows a modification of the structure illustrated by FIG. 14.

We may make use of thermocouples of a platinum and rhodium alloy containing 5% of rhodium and a platinum and rhodium alloy containing 40% of rhodium for twisted conductors 43a and nontwisted conductors 43b of FIG. 14, one end of which is welded at 46 to constitute the hot weld, the temperature of which is determined by the thermocouple. These thermocouples play the same part as those provided in the embodiments of FIGS. 7 to 11. The two conductors 43a and 43b of a thermocouple are housed over a portion of their length in an insulating alumina tube 47 protected at its upper part by a stainless steel tube 48.

Figure 12:
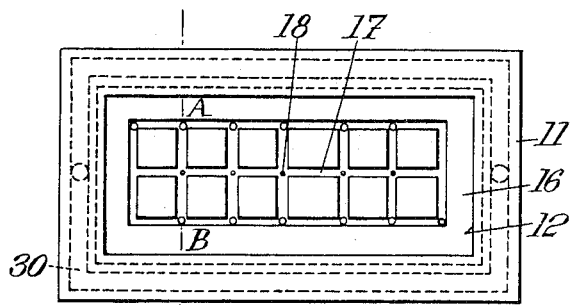
FIG. 12 is a top plan view of a modification of the metal block of FIG. 7.
Figure 13:
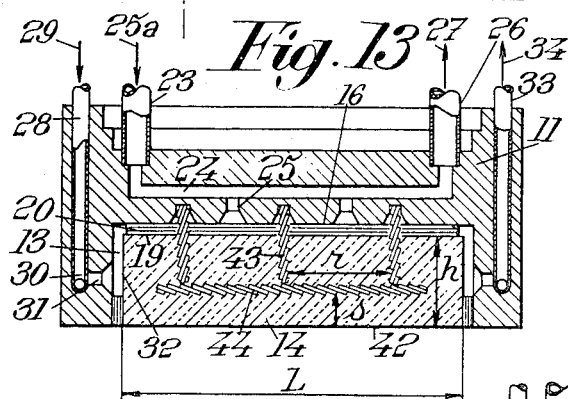
FIG. 13 is a sectional view of the block of FIG. 12 with the electrode in position.

In the embodiment of FIGS. 12 to 14 (or in that of FIGS. 12, 13 and 15) given by way of example, the dimensions and the distances are as follows:

(a) Electrode:

|   | mm. (range) |
|---|---|
| Length L | 100–200 |
| Width l | 5– 30 |
| Height h | 7– 15 |

(b) Cross-section of the twisted rods: approximately from 1 to 2 mm. with a core of the order of 0.5 mm.

(c) Pitch of the network of twisted (or threaded) rods:

Height s of rods 44 above hot face 42: from 3 to 6 mm. according to the value of h (as a matter of fact if s is greater than 6 mm., rods 44 are too cold and do not recuperate current and if s is smaller than 2 mm., rods 44 risk melting), Distance r between rods 43: from 6 to 10 mm. (so that oxygen truly diffuses around the intersections where it arrives).

Of course instead of the arrangement of the twisted or threaded rods 43, 44, 45 of FIGS. 12 to 15 as diagramatically illustrated by FIG. 16, we could use other arrangements, for instance those illustrated by FIGS. 17 and 18 which also include rods 43 perpendicular to the network of rods 44 and 45. In the case of an arrangement as shown by FIG. 17, the distance between these rods 43 and the side face of the electrode is at least equal to 20 mm., to ensure a good mechanical behavior, and the distribution of the gas rich in oxygen is made as in FIGS. 7 to 11.

In a likewise manner the ceramic material electrodes may have other shapes than the parallelepipedal shape illustrated by the drawings. In particular they may have the shape of a frustum of a pyramid.

On the other hand we have, up to now, described with reference to FIGS. 12 to 18 a magnetohydrodynamic generator cathode. The same construction might be used to obtain an anode, possibly without channels 17 and the feed system thereof for supplying an oxygen containing gas (primary circuit), because, as stated with reference to FIGS. 1 to 6, the circulation of the oxygen containing gas must take place, in an anode, along the hot face and in this case the circulation of secondary air is sufficient (on the contrary it is the circulation of primary air along the cold face that is absolutely necessary in the case of a cathode).

However we may also provide a magnetohydrodynamic generator comprising both cathodes and anodes of the illustrated type (with circulation of primary oxygen containing gas and of secondary oxygen containing gas). In this case it would be possible from time to time to reverse the polarity of the magnetic field, the same electrodes playing the part now of anodes and now of cathodes, such an operation having the advantage of increasing the duration of life of the electrodes by reducing the wear thereof during their operation as cathodes.

We thus provide, according to the different embodiments of the invention, a hot electrode (and in particular a hot cathode) for a M.H.D. generator, especially of the open cycle or circuit type, the operation of which results sufficiently from what precedes for making it unnecessary further to describe it.

Such a hot electrode has, with respect to those existing at the present time, many advantages and in particular the following ones:

First the stability of the hot electrode is very good, the detrimental phenomenons of modification of the structure by electrolysis being eliminated or at least considerably reduced;

Oxygen, used as oxidizer, has the advantage of giving, in its reduced formula, one of the ions of zirconia: $O^{2-}$;

The efficiency and power of the generator are increased;

The risks of producing destructive arcs are reduced;

We ensure a circulation of the oxygen containing gaseous stream at least at the level of the cathode zone of the electrode under given pressure and flow rate conditions, a sufficient amount of oxygen containing gas being fed to the zone of the ceramic material where is produced the transformation of the charge carriers from the electronic to the anionic state to ensure stability thereof;

The support constitutes an excellent mechanical, thermal and possibly electrical connection between the ceramic electrode and the electrode carrier proper, with compensation of the variations of expansion between the metal block and the ceramic material electrode and thermal transfer between the electrode and a water chamber;

It permits of measuring the temperature of the electrode hot face, possibly at many different points thereof, and also, if so desired, the potential distribution along the electrode;

The network of twisted or threaded rods ensures an excellent mechanical behavior of the electrode and constitutes at the same time a good thermal and possibly electrical connection between the ceramic material electrode and the electrode carrier proper.

In a general manner, while we have, in the above description disclosed what we deem to be a preferred embodiment of the invention, it should be well understood that we do not wish said invention to be limited thereto as there might be changes made in the arrangement, disposition and form of the parts without departing from the present invention as comprehended within the scope of the appended claims.

What we claim is:

1. In combination, a magnetohydrodynamic generator hot electrode made of a material having an at least partly ionic conduction by means of $O^{--}$ ions, and means for injecting an oxygen containing gas into said electrode at the level of the cathode zone of said electrode in order to supply $O^{--}$ ions to said cathode zone.

2. A combination according to claim 1 wherein said electrode is provided with a network of channels for the feed, circulation and outflow of said oxygen containing gas in said electrode cathode zone.

3. In combination, a magnetohydrodynamic generator hot electrode made of a material having an at least partly ionic conduction, said material including, at the level of the cathode zone of the electrode, a region having a great open porosity, and means for injecting an oxygen-containing gas into the electrode at the level of said cathode zone, said means comprising conduits for the feed of said oxygen-containing gas to said region having great open porosity and conduits for the outflow of the gas having flown through said region.

13

4. A combination according to claim 3 wherein said electrode is a cathode, including a current collector, said cathode zone being the surface of contact between said cathode and said current collector.

5. A combination according to claim 3 wherein said electrode is an anode, said cathode zone being the surface of contact between said anode and the stream of plasma flowing along it.

6. A combination according to claim 3 wherein said oxygen containing gas is air enriched in oxygen.

7. A combination according to claim 3 wherein said electrode is made of a ceramic material.

8. A combination according to claim 3 wherein said electrode is made of a zirconia stabilized in cubic phase.

9. A method of making a combination according to claim 3 wherein said electrode is made of a ceramic material which comprises, to form said region of great open porosity, introducing silver into said region of the ceramic material and subjecting the ceramic material to a sintering operation capable of eliminating said silver.

10. A combination according to claim 3 further comprising twisted rods embedded in said material, forming a reinforcement for said material.

11. A combination according to claim 10 wherein said rods are made of a platinum alloy.

12. A combination according to claim 11 wherein said alloy is a platinum and rhodium alloy.

13. A combination according to claim 10 comprising at least one wire extending through said material and electrically insulated therefrom, said wire forming a thermocouple with one of said rods.

14. A combination according to claim 13 wherein said rods are made of a platinum alloy and said wire is made of a platinum alloy of a composition different from that of said first mentioned platinum alloy.

15. A method of making a magnetohydrodynamic generator hot cathode made of a material having an at least partly ionic conduction and including a current collector whose surface of contact with said cathode forms the cathode zone, and having means for injecting an oxygen-containing gas into the cathode at the level of said cathode zone, which method comprises forming a grid every element of which is made of two metal wires, to wit one of a noble material and one soluble in an acid, embedding said grid in a ceramic material and pressing the whole into a mass, subjecting said mass to a first sintering operation, treating said mass by an acid to dissolve the wires soluble in acid, washing and drying the treated mass and subjecting it to a second sintering operation at a temperature higher than that of the first sintering operation.

16. A method according to claim 15 wherein the two metal wires of every element are contiguous.

17. A method according to claim 15 wherein the two metal wires of every element are at a distance from each other.

18. A method of making a magnetohydrodynamic generator hot cathode made of a material having an at least partly ionic conduction and including a current collector whose surface of contact with said cathode forms the cathode zone, and having means for injecting an oxygen-containing gas into the cathode at the level of said cathode zone, which method comprises forming a grid every element of which is made of two metal wires, to wit one of a noble material and one soluble by anodic electrochemical action, embedding said grid in a ceramic material and pressing the whole into a mass, subjecting said mass to a first sintering operation, subjecting said mass to electrolysis to dissolve the soluble wires, washing and drying the treated mass and subjecting it to a second sintering operation at a temperature higher than that of the first sintering operation.

19. A method according to claim 18 wherein the two metal wires of every element are contiguous.

20. A method according to claim 18 wherein the two metal wires of every element are at a distance from each other.

21. A method of making a magnetohydrodynamic generator hot cathode made of a material having an at least partly ionic conduction and including a current collector whose surface of contact with said cathode forms the cathode zone, and having means for injecting an oxygen-containing gas into the cathode at the level of said cathode zone, which method comprises forming a grid every element of which is made of two metal wires, to wit one of a noble material and one of silver, embedding said grid in a ceramic material, pressing the whole into a mass and subjecting said mass to a sintering operation to eliminate the silver wires.

22. A method according to claim 21 wherein the two metal wires of every element are contiguous.

23. A method according to claim 21 wherein the two metal wires of every element are at a distance from each other.

24. In combination, a magnetohydrodynamic generator hot electrode made of a material having an at least partly ionic conduction and means for injecting an oxygen-containing gas into said electrode at the level of the cathode zone of said electrode, wherein said electrode has a face along which flows the stream of plasma, and includes platinum wires extending through the electrode and perpendicular to said face, for collecting electric current from the electrode.

25. In combination, a magnetohydrodynamic generator hot electrode made of a material having an at least partly ionic conduction and means for injecting an oxygen-containing gas into said electrode at the level of the cathode zone of said electrode, further comprising a metal block provided with a recess having a bearing bottom face, said electrode having a face thereof, which is its cold face, adapted to bear upon said metal block bottom face, a plurality of conducting metal strips interposed between said metal block bottom face and said electrode cold face to form a mechanical and thermal connection between said faces, said metal block being provided with conduits for the feed of the oxygen containing gas thereto, said conduits forming the means for injecting the oxygen containing gas, and with conduits for the outflow of the gas having flown through the electrode, and metal wires extending from said electrode through said cold face thereof, said metal wires passing through said metal strips and through said metal block, said metal block being provided with conduits for the flow of a cooling fluid.

26. A combination according to claim 25 wherein said electrode is made of a porous semi-conductor substance.

27. A combination according to claim 25 wherein said electrode is made of a ceramic material of the zyrconia type.

28. A combination according to claim 25 wherein said metal block bearing face is provided with two sets of channels at right angles to each other.

29. A combination according to claim 28 wherein said conduits form two circuits, to wit, on the one hand, a primary circuit for feeding an oxygen containing gas to said electrode cold face, said primary conduit including a chamber in said metal block parallel to said cold face and said channels and, on the other hand, a secondary circuit for feeding an oxygen containing gas to the edge of said electrode said secondary circuit including a conduit running along the periphery of said electrode.

30. A combination according to claim 25 wherein said metal strips form two sets of strips at right angles to each other.

31. A combination according to claim 29 wherein said metal strips extend parallel to said channels and each at mid-distance between two consecutive channels.

32. A method of obtaining a combination according to claim 25 wherein every metal strip is obtained by depositing first a layer of palladium and then a layer of silver-palladium alloy on the one hand on the electrode cold face and on the other hand on the metal block bearing face, then applying said cold face against said bearing face and heating to weld the two silver-palladium layers together.

33. A combination according to claim 25 wherein said metal wires are made of platinum.

34. A combination according to claim 33 wherein said metal block is provided with tubular passages and the ends of said metal wires opposed to those located in said electrode are engaged in said passages where they are electrically connected with said metal block.

35. A combination according to claim 29 wherein said metal block is provided with tubular passages transverse to said chamber and ending therein and said metal wires extend through said passages into said chamber where they have their ends bent and electrically connected to said metal block.

36. A combination according to claim 25 further including at least one supplementary metal wire forming a thermo-couple with one of said metal wires and extending through said metal block without being in electric contact therewith.

References Cited

UNITED STATES PATENTS

| | | | |
|---|---|---|---|
| 3,149,253 | 9/1964 | Luebke | 310—11 |
| 3,165,652 | 1/1965 | Prater | 310—11 |
| 3,170,077 | 2/1965 | Blackman et al. | 310—11 |
| 3,215,870 | 11/1965 | Brill | 310—11 |
| 3,274,408 | 9/1966 | Louis | 310—11 |
| 3,275,860 | 9/1966 | Way | 310—11 |

DAVID X. SLINEY, Primary Examiner